United States Patent

[11] 3,629,664

| [72] | Inventor | Peter A. Lajoie |
| | | Chelmsford, Mass. |
| [21] | Appl. No. | 88,624 |
| [22] | Filed | Nov. 12, 1970 |
| [45] | Patented | Dec. 21, 1971 |
| [73] | Assignee | Allegheny Ludlum Industries, Inc. |
| | | Continuation-in-part of application Ser. No. 811,902, Apr. 1, 1969, now abandoned. This application Nov. 12, 1970, Ser. No. 88,624 |

[54] SOLID-STATE TIMING MODULE
8 Claims, 12 Drawing Figs.

[52] U.S. Cl. .................................................. 317/141 S, 317/113, 307/132 E, 307/141
[51] Int. Cl. .................................................. H02b 1/04, H01h 47/18, H01h 47/32
[50] Field of Search .................................................. 317/113, 141 S, 142 R; 307/132 E

[56] References Cited
UNITED STATES PATENTS

| 3,371,252 | 2/1968 | James | 317/123 |
| 3,381,180 | 4/1968 | Felcheck | 317/148.5 |
| 3,337,778 | 8/1967 | Becker | 317/DIG. 9 |
| 3,541,392 | 11/1970 | Vargo et al. | 317/142 R |
| 3,562,595 | 2/1971 | Swanson et al. | 317/142 R |

Primary Examiner—L. T. Hix
Attorney—Vincent G. Gioia

ABSTRACT: A solid-state timing module for direct current relay control systems characterized in that a combination of timing circuits are housed on a single pronged header and provided with means for interconnecting the circuits in various configurations to effect different timing modes and timing ranges. The module eliminates the necessity for stocking a wide variety of time delay relays and results in reduction of maintenance problems.

INVENTOR.
PETER A. LAJOIE

Attorney

INVENTOR.
PETER A. LAJOIE

Attorney

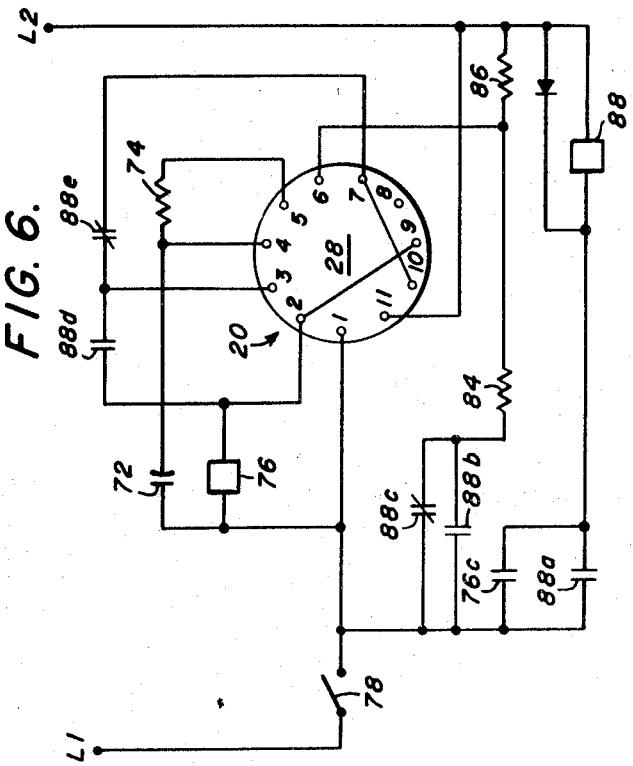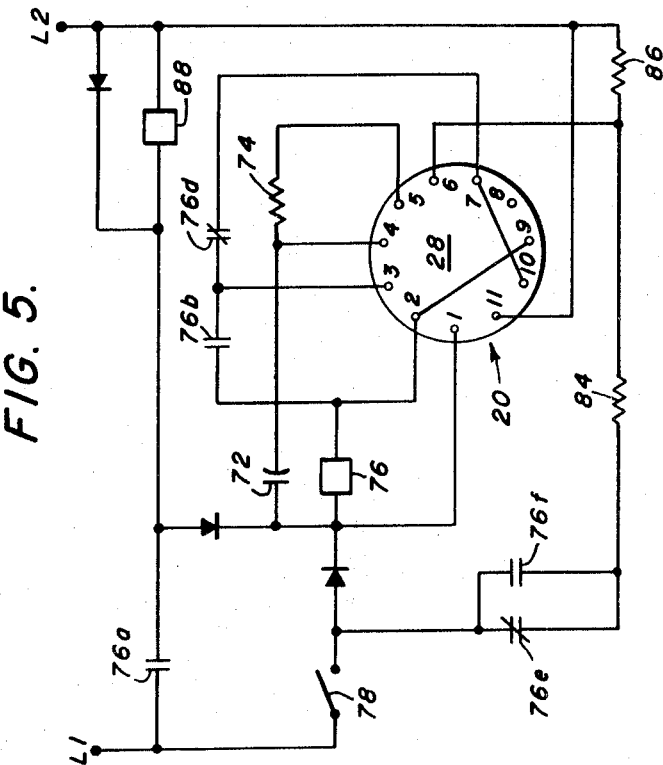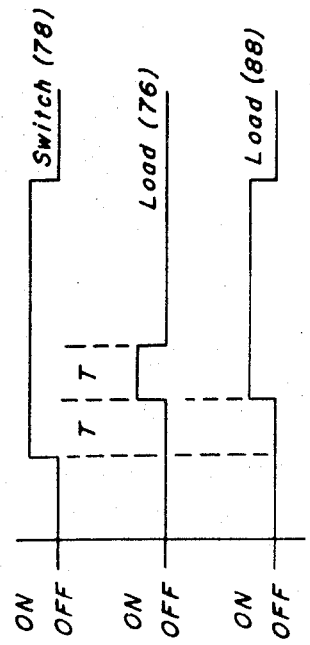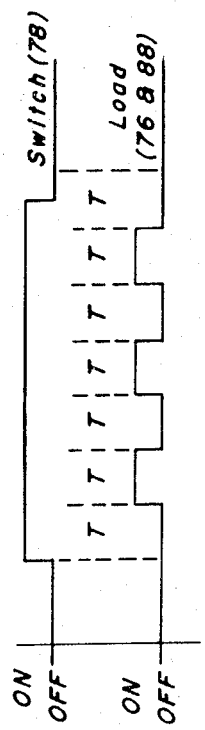

3,629,664

SOLID-STATE TIMING MODULE

CROSS-REFERENCES TO RELATED APPLICATIONS

This application is a continuation-in-part of copending application Ser. No. 811,902, filed Apr. 1, 1969, and assigned to the Assignee of the present application, now abandoned.

BACKGROUND OF THE INVENTION

With the advance of automation in industry, the industrial electronics field has seen an increased use of timing modules in direct current relay control systems to perform the many different timing modes in the repetitive functions of modern automatic manufacturing equipment. Virtually every piece of machinery utilized in manufacturing and employing any form of remote control utilizes sequencing or timing devices. Conventionally, these control systems have been developed on a piecemeal basis for each particular machine, with the result that a multitude of various circuit components must be warehoused to facilitate immediate replacement during operation of the machinery. The resulting stock of various time delay relays and other circuit components represents a large investment in money as well as storage space; and, of course, there is always the possibility of one or more components being out of inventory, possibly resulting in the shutdown of production equipment.

SUMMARY OF THE INVENTION

In accordance with the present invention, a timing module is provided including, as three basic circuits, a trigger section which will produce an output voltage spike whenever the magnitude of an input signal applied to a resistance-capacitance network exceeds a predetermined amplitude, a nonlatching switch such as a transistor switch, and a latching switch such as a semiconductive controlled rectifier. All three basic circuits are mounted on a plug-in type module such as a conventional eleven-pin header. By interconnecting the three basic circuits in various configurations and by connecting external timing means such as a resistance-capacitance network to terminals on the module, various and different types of timing functions can be derived such as a delayed interval (one shot); a delayed dropout; or a delayed pull-in. Furthermore, by utilizing contacts from the load relay, the module may provide additional timing functions such as delayed pull-in and dropout, or a cycling timer comparable to an astable multivibrator.

DESCRIPTION OF THE PREFERRED EMBODIMENTS

The above and other objects and features of the invention will become apparent from the following detailed description taken in connection with the accompanying drawings which form a part of the this specification, and in which:

FIG. 5 is a schematic drawing of the solid-state timing module of the invention mounted on an eleven-pin socket with interconnections for a cycling function;

FIG. 5a illustrates the timing function of the circuit of FIG. 5;

FIG. 6 is a schematic drawing of the solid-state timing module mounted on an eleven-pin socket with interconnections for a delayed interval function; and FIG. 6a illustrates the timing function of the circuit of FIG. 6.

BASIC TIMING MODULE—FIG. 1

Figure 1:
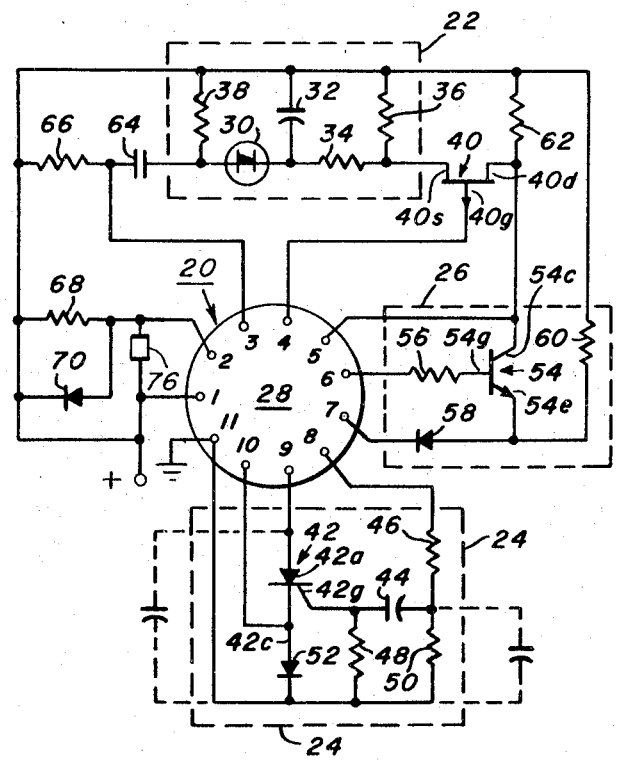
FIG. 1 is a schematic drawing of one embodiment of the solid-state timing module of the invention mounted on an eleven-pin, plug-in socket.

With reference now to the drawings, and particularly to FIG. 1, the reference numeral 20 indicates a basic timing module having a trigger section 22, a latching switch 24, and a nonlatching switch 26 mounted on a plug-in module 28, such as an eleven-pin header. As will be seen, the load for the module shown in FIG. 1 is normally a relay which is indicated by the reference numeral 76 and connected between pins 1 and 2.

A source of positive potential is applied to pin 1; while pin 11 is grounded (i.e., connected to the negative terminal of the supply source). Because of the inductive nature of a relay coil, resistor 68 and diode 70 are necessary. Diode 70 suppresses the inductive kick when attempting to dropout the relay; while resistor 68 provides the initial current path when the relay is energized by a semiconductive controlled rectifier 42 in latching switch 24 in a manner hereinafter described. Without resistor 68, the semiconductive controlled rectifier 42 may not latch up when triggered.

The trigger circuit 22 is made up of or associated with resistor 66, capacitor 64, resistor 38, trigger diode 30, capacitor 32 and resistor 34. As is know, the trigger diode 30 is a four-layer device which acts much like a semiconductive controlled rectifier except that it is switched from an OFF state to an ON state by exceeding its forward breakover voltage. In operation, and as will be explained hereinafter, a positive step input voltage is applied to pin 1; while a negative voltage is applied to pin 4. As the voltage at the junction of resistor 34 and resistor 36 begins to drop, the capacitor 32 charges up, thereby causing the voltage across the four-layer trigger diode 30 to build up also. The time constant of resistor 34 and capacitor 32 is of no consequence, being only a little over 5 milliseconds, and is not to be considered as the resistance-capacitance timing parameter of the module. This is provided by an external resistance-capacitance network as will hereinafter be explained. The resistor 34 is needed only to protect a field effect transistor 40. When the voltage across breakover diode 30 is sufficient to switch the diode ON, then capacitor 32 discharges into resistor 38 through diode 30, providing a narrow negative-going voltage spike at the junction of capacitor 64 and resistor 66. Capacitor 64 provides the coupling for the spike; while resistor 66 functions as a discharge path for capacitor 64 and as a bias path for the diode 30.

The input to the trigger circuit is buffered with the field effect transistor 40. The field effect transistor includes a source electrode 40s, a drain electrode 40d and a gate electrode 40g. The gate electrode 40g is connected to pin 4 as shown; the source electrode 40s is connected to the junction of resistors 34 and 36; and the drain electrode 40d is connected through resistor 62 back to pin 1. The high input impedance of the field effect transistor 40 allows the use of large values of capacitance in an external resistance-capacitance timing network, resulting in long time delays. The field effect transistor is used as a source follower for charging capacitor 32; and, because of the danger of destructive forward gate-to-source current from the timing capacitor when capacitor 32 suddenly discharges, resistor 34 is needed for limiting purposes. Resistor 36 merely serves to fully discharge capacitor 32 when diode 30 switches OFF.

The nonlatching switch 26 includes an NPN-transistor 54 having an emitter 54e, a collector 54c and base 54g. The base 54g is connected to pin 6 on the header through resistor 56; its emitter 54e is connected to pin 7 through diode 58; and its collector 54c is connected directly to pin 5 as well as to the bottom end of resistor 62. In shunt with the resistor 62 and transistor 54 is a resistor 60. The nonlatching switch comprises a conventional transistor switch of the type wherein the transistor 54 will be ON to conduct current whenever a positive potential is applied to its base. On the other hand, when a negative potential is applied to its base, the transistor will switch OFF. The function of resistor 60 and diode 56 is to provide a bias for cutting OFF transistor 54 when necessary.

The latching switch 24 is made up of semiconductive controlled rectifier 42 having an anode 42d connected to pin 9, a cathode 42c connected through diode 52 to pin 11 and a gate electrode 42g connected through capacitor 44 and resistor 46 to pin 8. Note that the cathode 42c is also connected to pin 10. The opposite sides of the capacitor 44 are connected to the pin 11 through resistors 48 and 50, respectively. If noise triggering occurs, optional capacitors 50a and 50b may be included in the circuit. As is known, a semiconductive controlled rectifier such as rectifier 42 will be triggered into conduction whenever a positive pulse is applied to its gate electrode 42g. The semiconductive controlled rectifier will continue to conduct until a source of anode voltage is disconnected therefrom. As will be seen, this is normally accomplished with the nonlatching switch 26.

A positive pulse or step function applied to pin 8 is coupled to the gate 42g by capacitor 44. The positive-going edge triggers the rectifier 42 into conduction provided there is sufficient latching and holding current available through an external load. Resistor 50 serves only to assure discharge of capacitor 44. Resistor 48 keeps the gate 42g from floating. Otherwise, the rectifier 42 would be susceptible to false triggering from noise sources. Triggering of controlled rectifier 42 may also be accomplished by pulsing its cathode 42c with a negative-going pulse via pin 10. Diode 52 provides this capability by allowing normal current flow for the rectifier and at the same time prevents a high-impedance to a negative pulse. Capacitor 50b can be used to suppress the $dv/dt$ rate across rectifier 42; while capacitor 50a can be used to short out high-frequency noise to the gate electrode 42g.

TIMED INTERVAL OR DELAYED DROPOUT—FIG. 2

Figure 2:
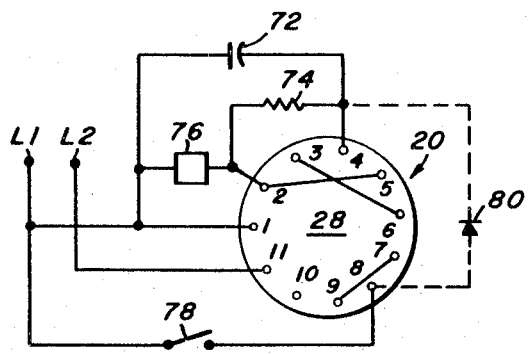
FIG. 2 is a schematic drawing of the solid-state timing module mounted on an eleven-pin, plug-in socket with connections for a timed interval and delayed dropout function.

FIG. 2 shows the various interconnections of the pins on the nodule connected to form either a timed interval or delayed dropout function. The essential difference between the two is that when a delayed dropout function is desired, the diode 80 must be connected between pins 4 and 8; whereas when only a timed interval is required, the diode 80 is eliminated.

A source of positive potential is connected to input terminal L1 while terminal L2 is grounded or connected to the negative terminal of the power supply source. Hence, as explained above, a source of positive potential appears at pin 1; and pin 11 is grounded. The positive terminal L1 is also connected through switch 78 to pin 8. Connected between pin 1 and pin 4 is a capacitor 72; while between pin 2 and pin 4 is a resistor 74. As will be seen, the capacitor 72 and resistor 74 provide the basic resistance-capacitance timing interval for the circuitry. Pins 7 and 9 are interconnected, meaning that the anode of rectifier 42 (FIG. 1) is connected through diode 58 to the emitter of transistor 54. Additionally, pins 2 and 5 are interconnected such that the collector of the transistor 54 is connected to one side of the load relay 76. Pin 3 is connected to pin 6, meaning that the junction of resistor 66 and capacitor 64 is connected to the base of the transistor 54.

Figure 2A:
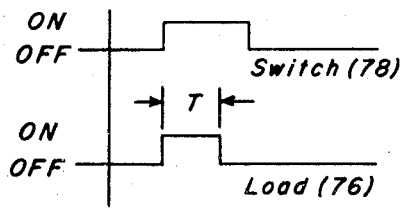
FIG. 2a illustrates the timing function of the circuit of FIG. 2 for a timed interval.

Assuming that the circuit is quiescent and that the switch 78 is then closed, a positive-going step voltage will be applied to pin 8 and will be coupled through capacitor 44 to the gate 42g of controlled rectifier 42. As a consequence, the controlled rectifier conducts with current flowing from the grounded or negative terminal L1 through diode 52, the rectifier 42, the connection between pins 9 and 7, diode 58, transistor 54 and through the connection between pins 5 and 2 back to one side of the load relay 76. Consequently, the load relay 76 switches ON at a point coinciding with the closing of switch 78 as shown in FIG. 2a. That is, assuming that the closing and opening of switch 78 produces a pulse, and that the current through the load relay 76 is also a pulse, then the leading edges of the two pulses coincide.

The foregoing description assumes, of course, that transistor 54 is conducting. The transistor 54 is rendered conducting with the connection shown by virtue of the fact that pin 6 is connected to pin 3. Hence, a positive voltage is applied via resistor 66 and resistor 56 to the base of the NPN-transistor causing it to conduct.

Summarizing the operation of the circuit to this point, the positive-going voltage at pin 8 upon closing of switch 78 initiates conduction through rectifier 42 and transistor 54; and since the emitter of transistor 54 is connected through pins 5 and 2 to one side of the load relay 76, the relay is energized. With resistor 54 conducting and controlled rectifier 42 conducting, the voltage at the collector of transistor 54 drops from about 24 volts to 3 volts. As a result, the external timing capacitor 72 begins to charge up through resistor 74 with the polarity shown. The field effect transistor 40, whose gate electrode is connected to pin 4 and the junction of elements 72 and 74, senses the voltage across the capacitor 72 and is used as a source follower. As a result, capacitor 32 can charge up no faster than capacitor 72. When the voltage at the cathode of breakover diode 30 reaches the breakover voltage, the diode 30 switches ON and capacitor 32 discharges into resistor 38, thereby producing a negative-going spike at the anode of diode 30. This spike is coupled to the base of transistor 54 through capacitor 64, the connection between pins 3 and 6, and resistor 56. As a result, the transistor 54 switches OFF, the anode voltage source is removed from controlled rectifier 42, the rectifier 42 cuts OFF and the load relay 76 becomes deenergized. This occurs after a time elapse T shown in FIG. 2a and is determined by the resistance-capacitance timing constant of elements 72 ad 74 shown in FIG. 2. Note that these are the only two timing elements employed and are external to the basic module.

Figure 2B:
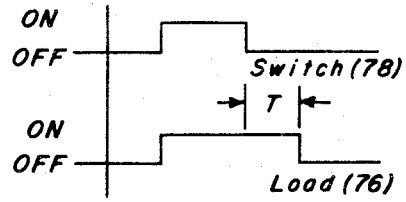
FIG. 2b illustrates the timing function of the circuit of FIG. 2 for a delayed dropout.

When the circuitry is to be used as a delayed dropout timer, diode 80 is connected between pins 4 and 8 as shown. This external diode acts to prevent the timing action from taking place until the input is removed. That is, the timing action cannot take place until switch 78 is again opened. This function is shown in FIG. 2b where the period during which the switch 78 is closed is shown as a pulse. The timing action cannot take place when switch 78 is opened since diode 80 couples the positive voltage on terminal L1 to the junction of resistor 74 and capacitor 72, thereby preventing the capacitor 72 from charging up. After the switch 78 opens, the positive voltage is removed from the junction of elements 72 and 74; and the capacitor 72 charges up until the breakover diode 30 again breaks down and applies a negative voltage spike to the base of transistor 54, thereby terminating the timing action. Hence, as shown in FIG. 2b, the load remains energized as long as the switch 78 is closed and for an additional time period T after the switch 78 is opened.

DELAYED PULL-IN—FIG. 3

Figure 3:
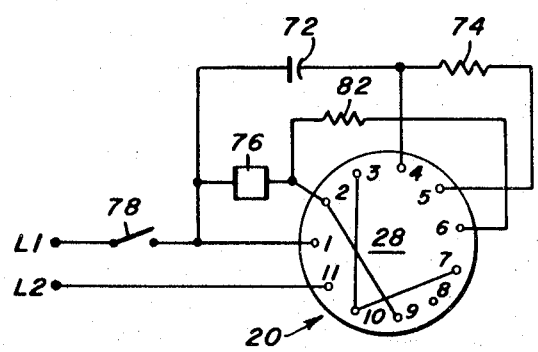
FIG. 3 is a schematic drawing of the solid-state timing module mounted on an eleven-pin socket with interconnections for a delayed pull-in function.
Figure 3A:
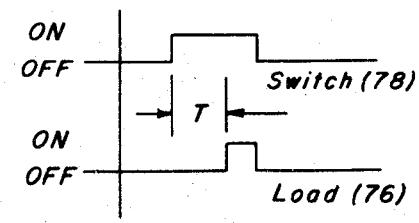
FIG. 3a illustrates the timing function of the circuit of FIG. 3.

The connections for a delayed pull-in function are shown in FIG. 3; while waveforms illustrating the operation of the delayed pull-in are shown in FIG. 3a. In this case, the positive terminal L1 is again connected to pin 1; but it is connected to pin 1 through the switch 78 which is the time period initiating switch. Likewise, the pin 11 is again connected to terminal L2 which is grounded or connected to the negative terminal of the voltage supply source. The load 76 is again connected between pins 1 and 2; however capacitor 72 is now connected in series with resistor 74 between pins 1 and 5; the junction of elements 72 and 74 being connected to pin 4. The resistor 82 connects pin 2 to pin 6; pins 2 and 9 are interconnected; pins 3 and 10 are interconnected; and pins 10 and 7 are interconnected.

When the switch 78 closes, a positive potential is applied to pin 1. As shown in FIG. 1, this positive potential is coupled through resistor 68 to pin 2; and since pin 2 is connected through external resistor 82 to pin 6, this same positive potential is applied through resistor 56 to the base of transistor 54, causing it to conduct. The resistor 82 is necessary to bias transistor 54 without drawing appreciable current through the load.

It will be noted that the emitter of transistor 54 (FIG. 1) is now connected through pins 7 and 10 and diode 52 to the negative terminal at pin 11. Consequently, current is drawn through the transistor 54, bypassing the controlled rectifier 42, with the result that the voltage at the collector of transistor 54 falls. This now causes capacitor 72 to charge through resistor 74 which is connected to pin 5 and, hence, the collector of transistor 54 which is now conducting. At the same time, the capacitor 32 in the trigger section 22 is charged in the manner described above in connection with FIG. 2 at the same rate at which capacitor 72 is charged.

When the voltage across capacitor 32 reaches the breakover voltage of diode 30, the diode breaks down and a negative spike is produced at its anode. This spike is now coupled through capacitor 64 and pins 3 and 10 which are now interconnected to the cathode of controlled rectifier 42, causing the rectifier to conduct. Since the anode of rectifier 42 is now connected through pins 9 and 2 to the upper terminal of the load relay 76, the upper terminal of the load relay is effectively at ground potential and it becomes energized. This, however, does not occur until after a time period T as shown in FIG. 3a following the initial closing of switch 78. The relay 76 will remain energized until the switch 78 is opened; whereupon the relay 76 becomes deenergized as shown in FIG. 3a. Hence, with the configuration of FIG. 3, the relay 76 will not become energized until a time period T following closing of switch 78 and will remain energized thereafter as long as switch 76 is closed. The time delay T is determined again by the external resistance-capacitance network 72, 74.

DELAYED PULL-IN AND DROPOUT—FIG. 4

Figure 4:
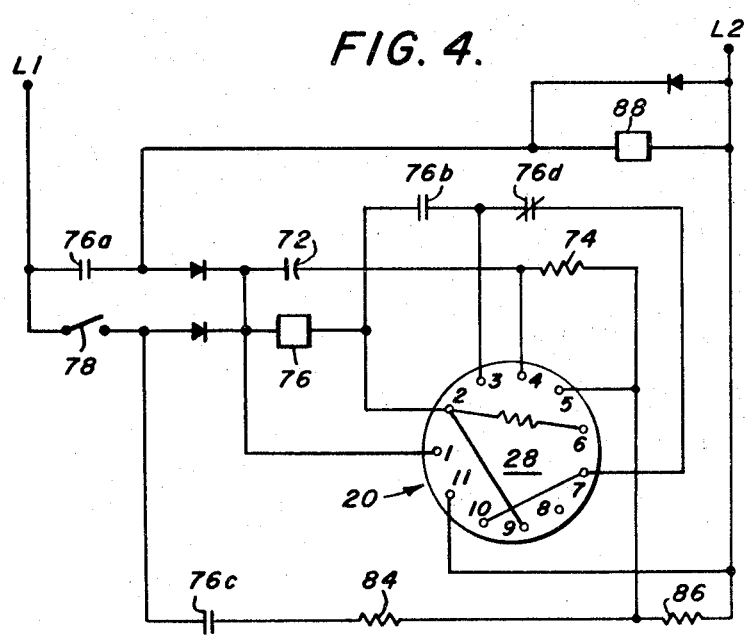
FIG. 4 is a schematic drawing of the solid-state timing module mounted on an eleven-pin socket with interconnections for delayed pull-in and delayed dropout functions.
Figure 4A:
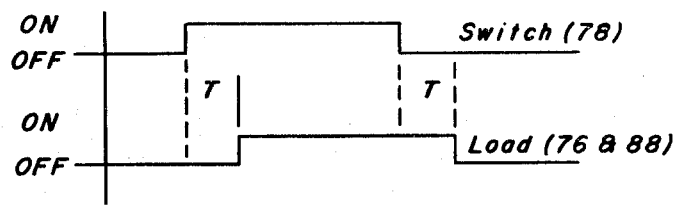
FIG. 4a illustrates the timing function of the circuit of FIG. 4.

A delayed pull-in and dropout function is accomplished with the circuit of FIG. 4. With this configuration, and with reference to FIG. 4a, it can be seen that load relays 76 and 88 will become energized after a time elapse T following closing of switch 78. After switch 78 is opened, the load relays 76 and 88 remain energized for the same time period T. In this configuration, pins 2 and 9 are interconnected; pins 10 and 7 are interconnected; and pins 2 and 6 are interconnected. The load relay 76 is again connected between pins 1 and 2; and the timing network consisting of capacitor 72 and resistor 74 is, as in FIG. 3, connected between pins 1 and 5. The relay 76 is provided with contacts 76a through 76d as shown.

In the operation of the circuit of FIG. 4, the switch 78 is closed, thereby connecting the positive terminal L1 o one side of the timing capacitor 72. When switch 78 is closed, the load relay 76 does not become energized since its one side is connected through pins 2 and 9 to the anode of controlled rectifier 42 which, at this time, is not conducting. The capacitor 72, however, begins to charge up when switch 78 is closed through resistor 74 and resistor 86 to the negative or grounded terminal L2. As capacitor 72 charges, so also does the capacitor 32 in the trigger section 22 in the manner described above. When the breakover diode 30 breaks down, a spiked voltage pulse is again coupled through capacitor 64 to the pin 3. This voltage pulse is then coupled through normally closed contacts 76d to pin 7 and pin 10 which is connected to the cathode of controlled rectifier 42 (FIG. 1). Consequently, the controlled rectifier 42 now conducts and a current path is provided between one side of the load relay 76 and ground through pins 2 and 9 and the controlled rectifier 42. Once the relay 76 is energized, the trigger circuit 22 is rendered inoperative by virtue of the fact that pin 5 of the module is at a voltage near the positive supply voltage.

When the switch 78 opens, the relay 76 nevertheless remains energized by virtue of the fact that a current path is provided to the positive supply terminal L1 through contacts 76a, which are now closed. Note also that when contacts 76a are closed upon energization of relay 76, the relay 88 is also energized between the power supply terminals L1 and L2. Hence, both of the relays 76 and 88 are energized or deenergized simultaneously.

As was stated above, the trigger section 22 is disabled during the time that switch 78 is closed and relay 76 is energized because pin 5 is at or near the positive supply voltage. That is, when relay 76 becomes energized, contacts 76c close, providing a path between pin 5 and the positive terminal L1. However, when switch 78 opens, pin 5 falls in voltage, whereupon the capacitor 72 again charges through resistors 74 and 86 until a spiked pulse appears at the output of the trigger section on pin 3. Pin 3 is now connected through contacts 76b, which are closed, to pin 2 and thence to pin 9 connected to the anode of the controlled rectifier 42. This action momentarily back biases the controlled rectifier and shuts it off. When this occurs, the current path between one side of relay 76 and the negative terminal is broken and the relay 76 becomes deenergized, whereupon contacts 76d again close and all of the other contacts for relay 76 are opened. The net result is that shown in FIG. 4a wherein the relays 76 and 88 turn ON after a time period T following closing of switch 78 and remain ON for the same time period T following opening of the switch 78. The time period T is again determined by the time constant of the resistance-capacitance network of elements 72 and 74.

CYCLING TIMER — FIG. 5

In FIG. 5, the module is connected to provide a cycling timer which acts somewhat like an astable multivibrator. In this case, the timing elements 72 and 74 are again connected between pins 1 and 5, but the load relay 76 is now connected between pin 1 and pin 6 through the parallel combination of contacts 76e and 76f and resistor 84. Note that one of the two contacts 76e is normally closed while the other is normally open. In the circuit configuration of FIG. 5, pin 2 is connected to pin 9; while pin 7 is connected to pin 10.

In the operation of the circuit of FIG. 5, switch 78 is initially closed. As a result, a positive voltage from terminal L1 is coupled through normally closed contacts 76e and resistor 84 to pin 6, thereby turning the NPN-transistor 54 ON in the nonlatching switch 26 (FIG. 1). At the same time, the capacitor 72 begins to charge through resistor 74 which is connected to pin 5 and, hence, the collector of transistor 54. This causes the capacitor 32 (FIG. 1) in the trigger circuit 22 to charge and produce a negative spiked pulse at pin 3. This is coupled through contacts 76d, which are now closed, to pin 7 and the pin 10 which is connected to the cathode of the controlled rectifier 42 (FIG. 1). The controlled rectifier 42 now conducts, and a current path is provided for energizing the load relay 76. Consequently, contacts 76a close energizing relay 88. At the same time, contacts 76d are open and contacts 76f are closed. However, in the transition process, both contacts 76e and 76f will be momentarily open, thereby removing the positive voltage from the base of transistor 54. This causes the transistor 54 to cut OFF: and since pin 5 now approaches the positive supply voltage, the capacitor 72 discharges, resetting the trigger circuit 22. When the transition is completed and contacts 76f close, the transistor 54 again conducts and capacitor 72 again charges to initiate a new timing cycle, at the end of which a spiked negative pulse again appears at pin 3. In this case, however, contacts 76d are open and contacts 76b are closed. Hence, the negative spiked pulse is applied through pins 2 and 9 to the anode of the controlled rectifier 42 (FIG. 1), causing the rectifier to turn OFF and deenergize relay 76. When the relay 76 becomes deenergized, contacts 76f open and contacts 76e close; but during the transition period the transistor 54 (FIG. 1) is again turned OFF, initiating a new timing cycle. This cycle is shown by waveforms in FIG. 5a. As long as the switch 78 remains closed, a pulsed output will appear comprising a series of pulses which are separated by the time period T and which have widths equal to the time period T.

DELAYED TIMING INTERVAL — FIG. 6

In FIG. 6, a delayed interval timing circuit is shown. This requires multiple contacts 88a–88e on a second load relay 88. When the switch 78 now closes, the positive supply terminal L1 is connected through normally closed contacts 88c and resistor 84 to pin 6 which in turn is connected to the base of transistor 54 in FIG. 1. Consequently, the transistor 54 now conducts. At the same time, the capacitor 72 charges through resistor 74 connected to pin 5. As the capacitor 72 charges, capacitor 32 in trigger circuit 22 (FIG. 1) also charges. The resulting negative spike at the pin 3 is coupled through normally closed contacts 88e and pins 7 and 10 to the cathode of controlled rectifier 42 (FIG. 1). Consequently, the controlled rectifier 42 conducts and relay 76 becomes energized through pins 2 and 9 and the controlled rectifier 42.

When the relay 76 becomes energized, its normally open contacts 76c close, thereby energizing the second load relay 88. The load relay 88 remains energized through closure of its own normally open contacts 88a. When relay 88 becomes energized, its contacts 88c open and contacts 88d close; however in the transition, as was the case in FIG. 5, the positive bias is removed from the base of transistor 54 such that capacitor 72 is discharged and a new timing cycle is again initiated. However, when a negative spike again appears at pin 3, it is coupled through contacts 88d which are now closed, and pins 2 and 9 to the anode of controlled rectifier 42, thereby causing the controlled rectifier to cut OFF. The load relay 76 now becomes deenergized; however load relay 88 does not dropout until switch 78 is opened. The relay 76, after it becomes deenergized, remains deenergized and it cannot again be energized. The trigger circuit 22 continues to retrigger, but no action occurs. Hence, the result is as shown in FIG. 6a wherein the load relay 76 is energized after a time delay T and remains energized for a period T while the load relay 88 becomes energized after a time delay T and remains energized as long as the switch 78 is closed.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. Timing circuitry for relay loads and the like, said circuitry being adapted to produce across a load energizing pulses in a predetermined timed sequence following actuation of an initiating switch and comprising at least three circuits incorporated into and forming an integral module, one of said circuits comprising a trigger section adapted to produce a spiked output pulse at a predetermined time following actuation of said initiating switch, a second of said circuits comprising a nonlatching switch, a third of said circuits comprising a latching switch, all of said circuits on the module being normally operationally disconnected one from the other, and terminals on said module for facilitating operational interconnection of said circuits and connection to an external initiating switch, a power supply and a least one load relay.

2. The timing circuitry of claim 1 wherein said module is provided with prongs electrically connected to said terminals for insertion into a plug to which external circuitry is connected.

3. The timing circuitry of claim 1 wherein said trigger section includes a capacitor, a breakover diode which will breakdown when the voltage across said capacitor exceeds a predetermined limit, and means including a field effect transistor for charging said capacitor.

4. The timing circuitry of claim 3 wherein said field effect transistor has a gate electrode connected to one of said terminals of the module, and including an external resistance-capacitance network, an external power supply, an an external initiating switch, said resistance-capacitance network being connected between said terminal to which said gate electrode is connected and said switch whereby upon closing of said switch the capacitor in said resistance-capacitance network will charge to control charging of said first-mentioned capacitor in the trigger section through said field effect transistor.

5. The timing circuitry of claim 1 wherein said nonlatching switch comprises a transistor having its emitter, collector and base each connected to a terminal on said module.

6. The timing circuitry of claim 5 wherein the emitter of said transistor is connected to an associated one of said terminals through a diode.

7. The timing circuitry of claim 1 wherein said nonlatching switch comprises a semiconductive controlled rectifier having its anode connected to a first of said terminals on the module and its cathode connected directly to a second of said terminals on the module, a diode connecting said cathode of the controlled rectifier to a third of said terminals on said module, and a control electrode for said controlled rectifier connected through a capacitor to a fourth of said terminals on said module.

8. The timing circuitry of claim 7 including a source of driving potential for said module, the negative terminal of said source of driving potential being connected to said third terminal.

* * * * *